United States Patent

[11] 3,602,937

| [72] | Inventor | Oliver K. Kelley<br>Bloomfield Hills, Mich. |
|---|---|---|
| [21] | Appl. No. | 27,596 |
| [22] | Filed | Apr. 13, 1970 |
| [45] | Patented | Sept. 7, 1971 |
| [73] | Assignee | General Motors Corporation<br>Detroit, Mich. |

[54] ADJUSTABLE DRIVE PIVOT MOUNTING FOR WINDSHIELD WIPER
5 Claims, 5 Drawing Figs.

[52] U.S. Cl. .................................................. 15/250.13,
15/250.34, 287/53 WA, 287/DIG. 8
[51] Int. Cl. ...................................................... B60s 1/34,
F16d 1/06
[50] Field of Search............................................. 15/250.13,
250.21, 250.23, 250.34, 250.35, 250.16;
287/52.02, DIG. 8, 53 WA

[56] References Cited
UNITED STATES PATENTS

| 2,856,212 | 10/1958 | Sacchini | 287/53 |
| 3,051,516 | 8/1962 | Ryck | 287/53 WA |
| 3,052,492 | 9/1962 | Schmitz et al. | 287/53 WA |
| 3,056,990 | 10/1962 | Ryck | 15/250.34 |

FOREIGN PATENTS

| 1,167,058 | 7/1958 | France | 287/53 WA |

*Primary Examiner*—Peter Feldman
*Attorneys*—W. E. Finken and W. A. Schuetz

ABSTRACT: In a preferred form, this disclosure relates to a windshield wiper mechanism for oscillating a windshield wiper across the outer surface of a windshield of a vehicle. The windshield wiper mechanism includes a support means which is adapted to be mounted on the vehicle, a bushing rotatably supported by the support means and having an axially extending eccentric opening therethrough, and a pivot shaft rotatably journaled in the eccentric opening and having one end connected to the wiper and its other end connected to a linkage for oscillating the pivot shaft. The windshield wiper mechanism further includes a means connected with the bushing for rotating the bushing relative to the support means to adjust the position of the pivot shaft relative to position of the operating linkage for the windshield wiper and thereby adjust the end position of the wiper relative to the side edge of the windshield pillar so that optimum visibility adjacent the windshield pillar can be provided.

PATENTED SEP 7 1971
3,602,937
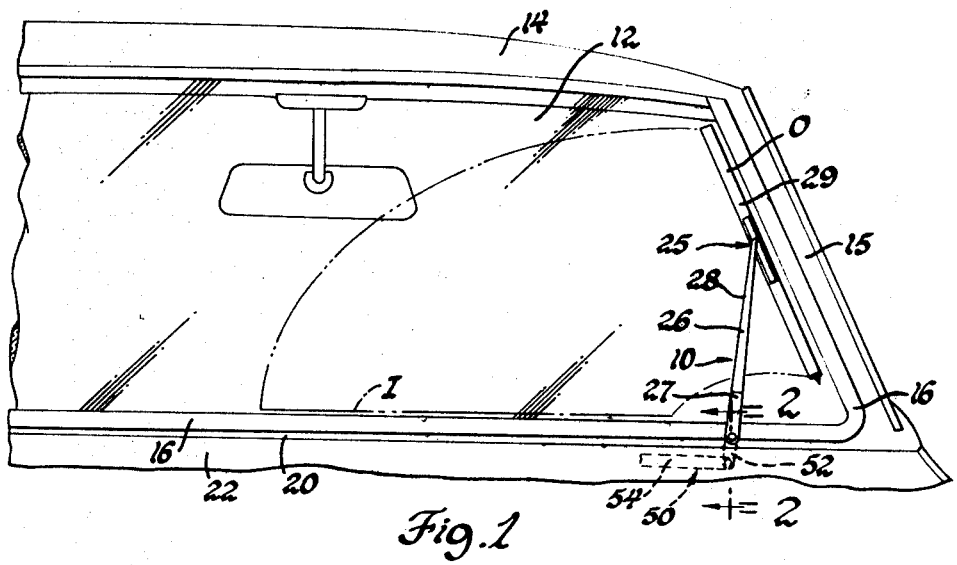
Fig.1
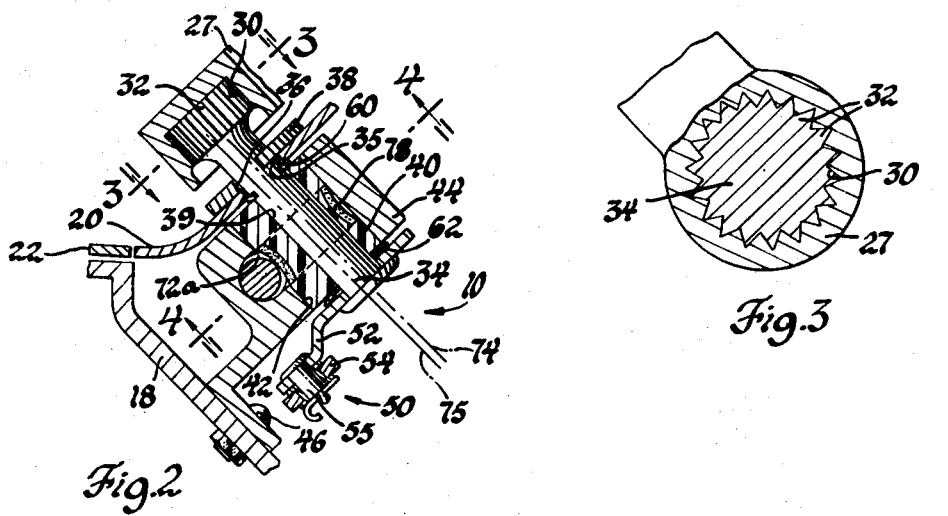
Fig.2
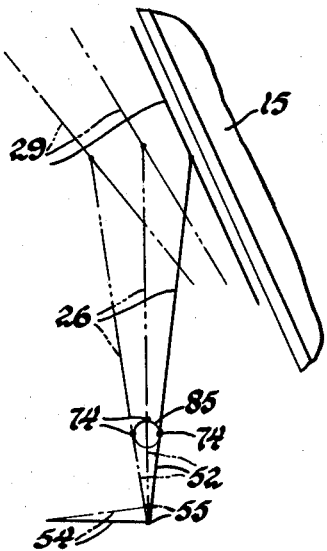
Fig.5
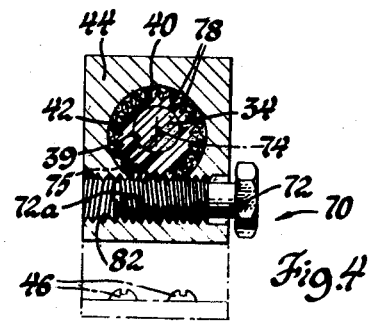
Fig.3
Fig.4
INVENTOR.
Oliver K. Kelley
BY
W. A. Schuetz
ATTORNEY

ADJUSTABLE DRIVE PIVOT MOUNTING FOR WINDSHIELD WIPER

The present invention relates to a windshield wiper mechanism, and in particular to a windshield wiper mechanism having a windshield wiper whose operating area or end position can be infinitely adjusted relative to the side edge of the windshield pillar.

At the present time most automotive vehicles are equipped with windshield wipers comprising a wiper arm for carrying a wiper blade assembly and with the wiper arm being connected to an oscillatory pivot shaft through mating serrated parts. The pivot shaft is journaled for oscillatory movement in a bracket means carried by the vehicle and the pivotal axis of the pivot shaft is located in a fixed position about which the wiper blade must oscillate. With this mated serrated parts type of arm to shaft attachment, the optimum relative angular adjustment of the wiper blade assembly relative to the side edge of the windshield pillar is limited to increments of 4°, or more. This limits the adjustment of the wiped area or end position of the wiper with respect to the side edge of the windshield pillar or its molding. Also, in dual wiper installations this often prevents accurate positioning of the wiper blade assemblies so that optimum wiping patterns for both blades can be achieved.

The present invention overcomes the above-noted difficulties by providing a windshield wiper mechanism wherein the operating end position of the wiper blade assembly can be infinitely adjusted relative to the side edge of the windshield pillar or reveal molding. This is accomplished by journaling the pivot shaft in an eccentric opening in a bushing rotatably supported by a support bracket or means and providing a means for rotating the bushing relative to the bracket means. During assembly, the serrated wiper arm of the wiper is first attached relative to the serrated end of the pivot shaft so that it is in the position closest to the desired operating end position and then the bushing is rotated to shift the axis of the pivot shaft relative to the position of the push-pull rod of the windshield wiper linkage which actuates the wiper blade. This in turn varies the end position of the wiper blade in relation to the windshield pillar or reveal molding so that optimum visibility adjacent the pillar of the windshield can be obtained.

Accordingly, an important object of the present invention is to provide a new and improved windshield wiper mechanism in which the oscillatory pivot shaft for oscillating a wiper can be shifted relative to its operating linkage for oscillating the pivot shaft, while the mechanism is running, to adjust the blade position relative to the pillar adjacent the side edge of the windshield so that optimum visibility adjacent the side edge of the windshield can be obtained.

Another object of the present invention is to provide a new and improved windshield wiper mechanism for an automotive vehicle in which a pivot shaft is connected to a wiper arm via mating serrated parts and rotatably journaled in an eccentric opening of a bushing rotatably supported by a bracket means mounted on the vehicle, and wherein the bushing means can be rotated relative to the bracket means to shift the position of the pivot shaft relative to its operating linkage when the wiper is in its outboard end position to enable the outboard end position of a wiper blade carried by the wiper arm to be adjusted relative to the pillar adjacent the side edge of the windshield.

The advantages of the windshield wiper mechanism of the present invention are that it provides for an infinite adjustment of the outboard end wiper position relative to the pillar at the side edge of the windshield. This enables the wiper blade assembly of the wiper to be coextensive with the pillar or reveal molding so as to be either in engagement therewith or parallel thereto when in the outboard end position. This enables the area of the windshield adjacent the pillar to be wiped so as to maximize visibility adjacent the pillar.

The present invention further resides in various novel constructions and arrangement of parts, and further objects, novel characteristics and advantages of the present invention will be apparent to those skilled in the art to which it relates and from the following detailed description of an illustrated embodiment thereof made with reference to the accompanying drawing forming a part of this specification and in which similar reference numerals or characters are employed to designate corresponding parts throughout the several views, and in which:

FIG. 1 is a fragmentary front elevational view of a vehicle embodying the novel windshield wiper mechanism of the present invention;

FIG. 2 is an enlarged fragmentary sectional view, with portions shown in elevation, taken approximately along line 2—2 of FIG. 1;

FIG. 3 is a fragmentary sectional view taken approximately along line 3—3 of FIG. 2;

FIG. 4 is a fragmentary sectional view taken approximately along line 4—4 of FIG. 2; and FIG. 5 is a view which graphically depicts the range of adjustments of the wiper arm relative to the lower edge of the windshield which can be effected by the windshield wiper mechanism of the present invention.

As representing an illustrated embodiment of the present invention, FIGS. 1 and 2 of the drawing show a windshield cleaning mechanism 10 for cleaning a windshield 12 of an automotive vehicle 14.

The vehicle includes suitable body structure including a pair of side pillars 15 (only one of which is shown) for supporting the windshield 12, a reveal molding 16 extending around the windshield 12, a suitable support structure or panel 18 for supporting the wiper mechanism 10 and a forwardly directed cowl 20 extending between the lower reveal molding 16 and a forwardly extending hood 22 of the vehicle 14.

The windshield wiper mechanism 10 includes a windshield wiper assembly 25 which can be of any suitable or conventional construction. The windshield wiper assembly 25 includes a wiper arm 26 having spring hinge connected inner and outer wiper arm sections 27 and 28, respectively. The outer wiper arm section 28 supports a wiper blade assembly 29 and in the manner such that the wiper blade assembly 29 is disposed at a fixed angle relative to the wiper arm 26. As best shown in FIGS. 2 and 3, the inner wiper arm section 27 has a serrated socket portion 30 which is drivingly connected to a serrated outer end portion 32 of a pivot shaft 34.

The pivot shaft 34 extends through aligned oversized openings 35 and 36 in the cowl 20 and an escutcheon 38 secured to the cowl 20, respectively. The pivot shaft 34 is rotatably journaled along its inner end portion in an axially extending, through opening 39 in an annular bushing 40. The bushing 40 can be of a metallic material, but preferably is made from a plastic, self-lubricating material. The bushing 40 is suitably rotatably supported or journaled within a through opening 42 of a bracket means 44, the bracket means 44 being mounted on the vehicle body structure 18 as by bolts 46.

The pivot shaft 34, in the illustrated embodiment, is adapted to be oscillated in opposite directions to cause the wiper 25 to be oscillated in opposite directions across the outer surface of the windshield between an inboard or parked position, designated by the letter I in FIG. 1, and an outboard position, designated by the letter O in FIG. 1, by a linkage arrangement 50. The linkage arrangement 50 could be of any suitable or conventional construction and is here shown as including a crank arm 52 which is fixed to the inner end of the pivot shaft 34 at one end and which is pivotally connected to a push-pull link or rod 54 at its other end via a pivot pin means 55. The link 54 is adapted to be pivotally connected to one end of a crank arm (not shown), the crank arm in turn being fixed to the output shaft of the unidirectional windshield wiper motor (not shown). The pivot shaft 34 is here shown as being held against relative axial movement with respect to the bushing 40 by a retaining ring 60 and a spring washer 62 interposed between the crank arm 52 and the bushing 40.

While only the rightmost windshield wiper 25 for wiping the right side of the windshield, as viewed from the front of the vehicle 14, has been shown in FIG. 1, it will of course be understood that the leftmost side would have a wiper which is identically supported and simultaneously driven from the wiper motor in an identical manner as the wiper 25.

In accordance with the provisions of the present invention, an adjustment means 70 is provided to enable the outboard end position 0 of the wiper blade assembly 29 to be adjusted so that the wiper blade assembly 29 will either engage or be disposed parallel the pillar 15, as shown in FIG. 1. Referring to FIGS. 1 and 3, it can be seen that when the mating serrated part of the windshield wiper arm 26 is connected to the serrated drive pivot 34 during assembly of the vehicle the position of the wiper blade assembly 29 with respect to the pillar 15 may not be an optimum one.

The adjustment means 70 for adjusting the position of the wiper blade assembly 29 with respect to the pillar 15 comprises the rotatable bushing 40 for eccentrically supporting the pivot shaft 34 and a threaded member in the form of a bolt 72 for rotating the bushing 40. As shown in FIG. 2, the axially extending opening 39 in the bushing 40 has an axis 74 which is parallel to, but laterally spaced from the central axis 75 of the bushing. In other words, the opening 39 is eccentric with respect to the center axis 75 of the bushing 40. The bushing 40 along its opposite ends is rotatably supported by the bracket means 44 and intermediate its opposite ends is provided with a circumferentially extending serrated or toothed portion 78 which is threadably engaged with the threads 72a of the bolt 72. The bolt 72 is also threadably engaged with a threaded through opening 82 in the bracket means 44, the opening 82 extending transversely of the opening 42 and being in communication therewith intermediate its ends.

When the bolt 72 is rotated its threaded engagement with the toothed portion 78 of the bushing 40 causes the bushing 40 to be rotated which in turn causes the axis 74 of the pivot shaft 34 to be moved relative to the operating linkage 52, 54 or in an arcuate or circular path relative to the lower reveal molding 16 of the windshield 12. This movement of the pivot shaft 34 will cause the outboard stroke end position of the wiper arm 26 relative to the pillar 15 to be varied, and enable optimum positioning of the wiper arm.

The adjustability of the windshield wiper relative to the pillar 15 is graphically depicted in FIG. 5. The circle 85 in FIG. 5 denotes the path of movement of the axis 74 of the pivot shaft 34 and the lines 26 and 29 denote different relative positions of the wiper arm 26 and wiper blade assembly 29 with respect to the pillar 15 of the windshield which are possible. Thus, it can be seen that when the windshield wiper 25 is connected to the serrated outer end portion 32 of the pivot shaft 34 during assembly onto the vehicle, and should the wiper blade 29 not be properly disposed closely adjacent or against the side reveal molding 16 or pillar 15, the assembler need merely rotate the adjusting bolt 72 to cause the bushing 40 to be rotated. This causes the axis 74 of the pivot shaft 34 to be shifted relative to the linkage 52, 54 and the distance between the wiper arm 26 and the pillar to be changed. The maximum extent of the adjustment between the wiper blade 29 and the pillar 15 will be dependent upon the eccentricity provided between the pivot axis 74 and the axis 75 of the bushing 40.

The double threaded engagement between the bolt 72 and the opening 82 and bushing portion 78 serves to lock the belt 72 in its adjusted position.

From the foregoing, it can be seen that a novel windshield wiper mechanism has been provided in which the wiper arm 26 and blade assembly 29 can be adjustably positioned with respect to the pillar 15 of the vehicle 14. It can also be seen that the optimum end position adjustment of the windshield wiper can be easily performed while the wiper is running, since the bolt 72 can be readily adjusted.

It should also be noted that although the windshield wiper mechanism has been described with respect to a vehicle in which the wiper blade assembly is parked against or parallel to the lower reveal molding of the windshield, it should be understood that the invention is equally applicable to a depressed park type wiper mechanism or a slot concealed windshield wiper arrangement in which the wiper blades are parked within the slot so as to be concealed from view.

The invention is also useful with windshield wipers in which the wiper blade is pivotal relative to the wiper arm about an axis normal to the plane of the windshield and in which an end of the wiper blade engages the side pillar of the windshield as the wiper approaches its outboard position and then pivots relative to the wiper arm as the wiper completes its outboard stroke. This type of wiper enables an even greater area of the windshield to be wiped than one which does not engage the pillar 15.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiper mechanism for oscillating a windshield wiper across an outer surface of a windshield of a vehicle between first and second end positions comprising: a support means which is adapted to be mounted on the vehicle; a bushing rotatably supported by said support means and having an eccentric axially extending opening therethrough; a pivot shaft rotatably journaled in said eccentric opening and having one end connected to said wiper, linkage means connected to said drive pivot for oscillating the pivot shaft; and means connected with said bushing for rotating said bushing relative to said support means to adjust the position of said pivot shaft relative to said linkage means whereby the end position of said wiper relative to an adjacent edge of said windshield can be adjusted while the wiper mechanism is in operation.

2. A windshield wiper mechanism as defined in claim 1 wherein said means for rotating said bushing includes a threaded member threadably engaged with a toothed portion on said bushing whereby rotation of said threaded member causes said bushing to be rotated relative to said support means.

3. In combination, an automotive vehicle having a windshield supported by its body structure and a windshield wiper mechanism for oscillating a windshield wiper across the outer surface of the windshield between an inboard position and an outboard position adjacent a pillar at the side edge of the windshield comprising: a bracket means mounted on said vehicle body structure; a bushing rotatably supported by said bracket means and having an eccentric axially extending opening therethrough, a pivot shaft rotatably journaled in said eccentric opening and having one end connected to a power driven linkage means for oscillating the pivot shaft; said windshield wiper comprising a wiper arm connected to the pivot shaft and a wiper blade assembly carried by said wiper arm; and means connected with said bushing for rotating said bushing relative to said support means to adjust the position of said pivot shaft relative to said linkage means whereby the outboard end position of the wiper relative to said pillar at the side edge of said windshield can be adjusted.

4. A windshield wiper mechanism as defined in claim 3 wherein said means for rotating said bushing includes a threaded member threadably engaged with a tooth portion on said bushing whereby rotation of said threaded member causes said bushing to be rotated relative to said support means.

5. In combination, an automotive vehicle having a windshield supported by its body structure and a windshield wiper mechanism for oscillating a windshield wiper across the outer surface of the windshield between an inboard position and an outboard position adjacent a pillar at the side edge of the windshield comprising: a bracket means mounted on said vehicle body structure; a bushing made from a self-lubricating material rotatably supported by said bracket means and having an axially extending eccentric opening therethrough; a pivot shaft having a center axis rotatably journaled in said eccentric opening and having one end connected to a power driven linkage means for oscillating said pivot shaft, said other end of said pivot shaft having a serrated outer surface, said wiper comprising a wiper arm having a serrated socket portion adjacent its lower end which is adapted to be connected with the serrated other end of the pivot shaft and a wiper blade assembly carried by said wiper arm, and adjusting means connected with said bushing for rotating said bushing relative to said support means to adjust the position of the axis of said pivot shaft relative to said linkage means whereby the outboard end position of said wiper blade assembly relative to said pillar at the side edge of said windshield can be adjusted, said adjusting means comprising a threaded member threadably connected with a threaded opening in said bracket means and also in meshed engagement with a threaded portion on said plastic bushing intermediate the ends of the latter whereby rotation of said threaded member causes said bushing means to be rotated to adjust the position of the axis of said pivot shaft relative to said linkage means.